United States Patent (10) Patent No.: US 9,726,258 B2
Ji et al. (45) Date of Patent: Aug. 8, 2017

(54) MULTI STAGE TRANSMISSION FOR VEHICLE

(71) Applicant: Hyundai Motor Company, Seoul (KR)

(72) Inventors: Seong Wook Ji, Ansan-si (KR); Seong Wook Hwang, Gunpo-si (KR); Woo Jin Chang, Suwon-si (KR); Won Min Cho, Hwaseong-si (KR); Hyun Sik Kwon, Seoul (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/938,677

(22) Filed: Nov. 11, 2015

(65) Prior Publication Data

US 2017/0074358 A1    Mar. 16, 2017

(51) Int. Cl.
*F16H 3/66*    (2006.01)
(52) U.S. Cl.
CPC ....... *F16H 3/66* (2013.01); *F16H 2200/0065* (2013.01); *F16H 2200/201* (2013.01); *F16H 2200/2046* (2013.01)
(58) Field of Classification Search
None
See application file for complete search history.

(56) References Cited

U.S. PATENT DOCUMENTS 6,071,208 A * 6/2000 Koivunen ................. F16H 3/66
                                                        475/275
8,303,455 B2    11/2012 Gumpoltsberger et al.
2006/0068965 A1 * 3/2006 Gumpoltsberger ..... F16H 3/663
                                                        475/275
2007/0252470 A1 * 11/2007 Lee ......................... H02K 1/276
                                                        310/216.049
2008/0103014 A1 * 5/2008 Gumpoltsberger ....... F16H 3/66
                                                        475/276
2009/0312139 A1 * 12/2009 Jang ........................ F16H 3/666
                                                        475/275

(Continued)

FOREIGN PATENT DOCUMENTS

JP         5185076 B2    4/2013
KR    10-2012-0025039 A    3/2012

*Primary Examiner* — Robert A Siconolfi
*Assistant Examiner* — Ryan Dodd
(74) *Attorney, Agent, or Firm* — Morgan Lewis & Bockius LLP

(57) ABSTRACT

A multi stage transmission for a vehicle may include an input shaft and an output shaft; first to third planetary gear device provided to transfer a torque between the input shaft and the output shaft and each including three rotating elements; and at least six shifting elements connected to the rotating elements of the first to third planetary gear devices, wherein the first planetary gear device has a first rotating element continuously connected to the input shaft and variably connected to a third rotating element of the third planetary gear device, a second rotating element fixedly installed by any one of the shifting elements and variably connected to the third rotating element of the third planetary gear device, and a third rotating element variably connected to a first rotating element of the second planetary gear device and continuously connected to a first rotating element of the third planetary gear device.

9 Claims, 2 Drawing Sheets

(56) References Cited

U.S. PATENT DOCUMENTS

| | | | |
|---|---|---|---|
| 2009/0312140 A1* | 12/2009 | Jang | F16H 3/666 475/275 |
| 2011/0136616 A1* | 6/2011 | Aota | F16H 3/666 475/296 |
| 2013/0150196 A1* | 6/2013 | Park | B60K 6/365 475/5 |

* cited by examiner

FIG. 2

| SHIFTING STAGE | CL1 | CL2 | CL3 | CL4 | B1 | B2 | GEAR RATIO |
|---|---|---|---|---|---|---|---|
| 1ST |  |  | O |  | O | O | 4.650 |
| 2ND |  |  | O | O |  | O | 3.237 |
| 3RD |  | O | O |  |  | O | 2.295 |
| 4TH | O |  | O |  |  | O | 1.667 |
| 5TH | O | O |  |  |  | O | 1.316 |
| 6TH | O | O |  | O |  |  | 1.000 |
| 7TH | O |  |  | O |  | O | 0.789 |
| 8TH | O |  |  | O | O |  | 0.739 |
| 9TH | O |  |  |  | O | O | 0.675 |
| REV |  | O | O |  | O |  | −3.100 | ns
MULTI STAGE TRANSMISSION FOR VEHICLE

CROSS REFERENCE TO RELATED APPLICATION

The present application claims priority to Korean Patent Application No. 10-2015-0129687, filed Sep. 14, 2015, the entire contents of which is incorporated herein for all purposes by this reference.

BACKGROUND OF THE INVENTION

Field of the Invention

The present invention relates to a multi stage transmission for a vehicle, and more particularly, to a technology capable of improving fuel efficiency of a vehicle by implementing shifting stages as many as possible by the number of components as small as possible and a simple configuration.

Description of Related Art

Recently, a rise in an oil price has become a factor allowing automobile manufacturers throughout the world to enter into unlimited competition toward fuel efficiency improvement, and in the case of an engine, an effort to improve fuel efficiency and decrease a weight through a technology such as downsizing, or the like, has been conducted.

Meanwhile, among methods of improving fuel efficiency that may be made by a transmission mounted in a vehicle, there is a method of allowing an engine to be driven at a more efficient driving point through a multi stage transmission to ultimately improve fuel efficiency.

In addition, the multi stage transmission as described above may allow the engine to be driven in a relatively low revolution per minute (RPM) band to further improve silence of the vehicle.

However, as shifting stages of the transmission are increased, the number of internal components configuring the transmission is increased, such that a mounting feature and transfer efficiency may be deteriorated and a cost and a weight may be increased. Therefore, in order to maximize a fuel efficiency improving effect through the multi stage transmission, it is important to devise a transmission structure capable of deriving maximum efficiency by a small number of components and a comparatively simple configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi stage transmission for a vehicle capable of maximizing fuel efficiency improvement of the vehicle through driving at an optimal driving point of an engine and improving silence of the vehicle through more silent driving of the engine by implementing at least forward nine stages and reverse one stage or more by a comparatively small number of components and a simple configuration.

According to an exemplary embodiment of the present invention, there is provided a multi stage transmission for a vehicle, including: an input shaft and an output shaft; a first planetary gear device, a second planetary gear device, and a third planetary gear device provided to transfer a torque between the input shaft and the output shaft and each including three rotating elements; and at least six shifting elements connected to the rotating elements of the first to third planetary gear devices, in which the first planetary gear device may have a first rotating element which is permanently connected to the input shaft and is variably connected to a third rotating element of the third planetary gear device, a second rotating element which is fixedly installed by any one of the shifting elements and variably connected to the third rotating element of the third planetary gear device, and a third rotating element which is variably connected to a first rotating element of the second planetary gear device and permanently connected to a first rotating element of the third planetary gear device, and the second planetary gear device may have a first rotating element which is fixedly installed by the other one of the shifting elements and variably connected to a first rotating element of the third planetary gear device, a second rotating element which is permanently connected to the output shaft and variably connected to the first rotating element of the third planetary gear device, and a third rotating element which is permanently connected to a second rotating element of the third planetary gear device.

The first planetary gear device, the second planetary gear device, and the third planetary gear device may be sequentially disposed along a rotating shaft direction of the input shaft and the output shaft.

The first planetary gear device and the second planetary gear device may be configured as a single pinion simple planetary gear device and the third planetary gear device may be configured as a double pinion simple planetary gear device.

The second rotating element of the first planetary gear device may be fixedly installed in a transmission case by a first brake among the shifting elements, the first rotating element of the second planetary gear device may be fixedly installed in the transmission case by a second brake among the shifting elements, and the rest of the shifting elements may be configured to form variable connection structures between the rotating elements of the planetary gear devices.

A first clutch among the shifting elements may form a variable connection structure between the first rotating element of the first planetary gear device and the third rotating element of the third planetary gear device; a third clutch among the shifting elements may form a variable connection structure between the second rotating element of the first planetary gear device and the third rotating element of the third planetary gear device; a fourth clutch among the shifting elements may form a variable connection structure between the first rotating element of the second planetary gear device and the first rotating element of the third planetary gear device; and a second clutch among the shifting elements may form a variable connection structure between the second rotating element of the second planetary gear device and the first rotating element of the third planetary gear device.

According to another exemplary embodiment of the present invention, there is provided a multi stage transmission for a vehicle, including: a first planetary gear device, a second planetary gear device, and a third planetary gear device each having three rotating elements; six shifting elements configured so as to variably provide a frictional force; and eight rotating shafts connected to the rotating elements of the planetary gear devices, wherein a first rotating shaft is an input shaft directly connected to a first rotating element of the first planetary gear device, a second rotating shaft is directly connected to a second rotating element of the first planetary gear device, a third rotating shaft is directly connected to a third rotating element of the first planetary gear device and a first rotating element of the third planetary gear device, a fourth rotating shaft is directly connected to a third rotating element of the third planetary gear device, a fifth rotating shaft is directly connected to a first rotating element of the second planetary gear device, a sixth rotating shaft is directly connected to a third rotating element of the second planetary gear device and a second rotating element of the third planetary gear device, a seventh rotating shaft is an output shaft directly connected to a second rotating element of the second planetary gear device, and a first clutch among the six shifting elements is installed between the first rotating shaft and the fourth rotating shaft, a second clutch is installed between the third rotating shaft and the seventh rotating shaft, a third clutch is installed between the second rotating shaft and the fourth rotating shaft, a fourth clutch is installed between the third rotating shaft and the fifth rotating shaft, a first brake is installed between the second rotating shaft and a transmission case, and a second brake is installed between the fifth rotating shaft and the transmission case.

The first planetary gear device, the second planetary gear device, and the third planetary gear device may be sequentially disposed along a rotating shaft direction of the input shaft and the output shaft.

The first planetary gear device and the second planetary gear device may be configured as a single pinion simple planetary gear device and the third planetary gear device may be configured as a double pinion simple planetary gear device.

The first clutch may be installed to variably connect between the first rotating element of the first planetary gear device and the third rotating element of the third planetary gear device, the second clutch may be installed to variably connect between the second rotating element of the second planetary gear device and the first rotating element of the third planetary gear device, the third clutch may be installed to variably connect between the second rotating element of the first planetary gear device and the third rotating element of the third planetary gear device, and the fourth clutch may be installed to variably connect between the first rotating element of the second planetary gear device and the first rotating element of the third planetary gear device.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation modes of the multi stage transmission for a vehicle of FIG. 1.

Figure 1:
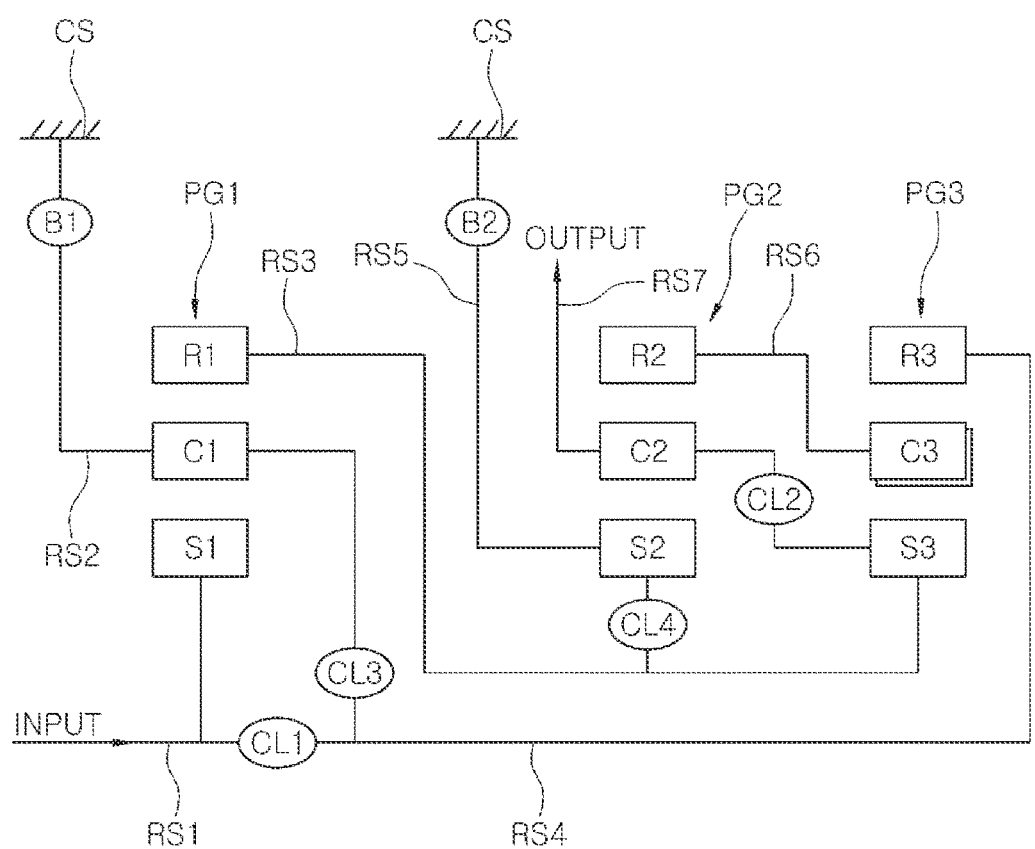
FIG. 1 is a configuration diagram showing a configuration of a multi stage transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a multi stage transmission for a vehicle according to an exemplary embodiment of the present invention is configured to include an input shaft IN and an output shaft OUT, a first planetary gear device PG1, a second planetary gear device PG2, and a third planetary gear device PG3 provided to transfer a torque between the input shaft IN and the output shaft OUT and each including three rotating elements, and at least six shifting elements connected to the rotating elements of the first to third planetary gear devices.

The first planetary gear device PG1 has a first rotating element S1 which is permanently connected to the input shaft IN and is variably connected to a third rotating element R3 of the third planetary gear device PG3, a second rotating element C1 which is fixedly installed by any one of the shifting elements and variably connected to the third rotating element R3 of the third planetary gear device PG3, and a third rotating element R1 which is variably connected to a first rotating element S2 of the second planetary gear device PG2 and permanently connected to a first rotating element S3 of the third planetary gear device PG3.

The second planetary gear device PG2 has a first rotating element S2 which is fixedly installed by the other one of the shifting elements and variably connected to a first rotating element S3 of the third planetary gear device PG3, a second rotating element C2 which is permanently connected to the output shaft OUT and variably connected to the first rotating element S3 of the third planetary gear device PG3, and a third rotating element R2 which is permanently connected to a second rotating element C3 of the third planetary gear device PG3.

The first planetary gear device PG1, the second planetary gear device PG2, and the third planetary gear device PG3 are sequentially disposed along a rotating shaft direction of the input shaft IN and the output shaft OUT.

The first planetary gear device PG1 and the second planetary gear device PG2 are configured as a single pinion simple planetary gear device and the third planetary gear device PG3 is configured as a double pinion simple planetary gear device.

The second rotating element C1 of the first planetary gear device PG1 is fixedly installed in a transmission case CS by a first brake B1 among the shifting elements and the first rotating element S2 of the second planetary gear device PG2 is fixedly installed to the transmission case CS by a second brake B2 among the shifting elements.

The rest of the shifting elements are configured to form variable connection structures between the rotating elements of the planetary gear devices.

That is, a first clutch CL1 among the shifting elements forms a variable connection structure between the first rotating element S1 of the first planetary gear device PG1 and the third rotating element R3 of the third planetary gear device PG3, a third clutch CL3 among the shifting elements forms a variable connection structure between the second rotating element C1 of the first planetary gear device PG1 and the third rotating element R3 of the third planetary gear device PG3, a fourth clutch CL4 among the shifting elements forms a variable connection structure between the first rotating element S2 of the second planetary gear device PG2 and the first rotating element S3 of the third planetary gear device PG3, and a second clutch CL2 among the shifting elements forms a variable connection structure between the second rotating element C2 of the second planetary gear device PG2 and the first rotating element S3 of the third planetary gear device PG3.

According to the present exemplary embodiment, the first rotating element S1, the second rotating element C1, and the third rotating element R1 of the first planetary gear device PG1 each are a first sun gear, a first carrier, and a first ring gear, the first rotating element S2, the second rotating element C2, and the third rotating element R2 of the second planetary gear device PG2 each are a second sun gear, a second carrier, and a second ring gear, and the first rotating element S3, the second rotating element C3, and the third rotating element R3 of the third planetary gear device PG3 each are a third sun gear, a third carrier, and a third ring gear.

The multi stage transmission for a vehicle configured as described above may also be represented as follows.

That is, the multi stage transmission for a vehicle according to an exemplary embodiment of the present invention is configured to include the first planetary gear device PG1, the second planetary gear device PG2, and the third planetary gear device PG3 each having three rotating elements, the six shifting elements configured to variably provide frictional force, and eight rotating shafts connected to the rotating elements of the planetary gear devices.

Here, a first rotating shaft RS1 is the input shaft IN directly connected to the first rotating element S1 of the first planetary gear device PG1, a second rotating shaft RS2 is directly connected to the second rotating element C1 of the first planetary gear device PG1, a third rotating shaft RS3 is directly connected to the third rotating element R1 of the first planetary gear device PG1 and the first rotating element S3 of the third planetary gear device PG3, a fourth rotating shaft RS4 is directly connected to the third rotating element R3 of the third planetary gear device PG3, a fifth rotating shaft RS5 is directly connected to the first rotating element S2 of the second planetary gear device PG2, a sixth rotating shaft RS6 is directly connected to the third rotating element R2 of the second planetary gear device PG2 and the second rotating element C3 of the third planetary gear device PG3, and a seventh rotating shaft RS7 is the output shaft directly connected to the second rotating element C2 of the second planetary gear device PG2.

Further, the first clutch CL1 among the six shifting elements is installed between the first rotating shaft RS1 and the fourth rotating shaft RS4, the second clutch CL2 is installed between the third rotating shaft RS3 and the seventh rotating shaft RS7, the third clutch CL3 is installed between the second rotating shaft RS2 and the fourth rotating shaft RS4, the fourth clutch CL4 is installed between the third rotating shaft RS3 and the fifth rotating shaft RS5, the first brake B1 is installed between the second rotating shaft RS2 and the transmission case CS, and the second brake B2 is installed between the fifth rotating shaft RS5 and the transmission case CS.

Since the multi stage transmission for a vehicle according to an exemplary embodiment of the present invention including the three simple planetary gear devices and the six shifting elements as described above may implement forward nine stages and reverse one stage depending on an operation mode table as shown in FIG. 2, it may implement a multi stage shifting stage of nine stages by a relatively small number of components and a simple configuration to contribute to improvement of fuel efficiency and silence of the vehicle, thereby making it possible to improve salability of the vehicle.

As set forth above, according to exemplary embodiment of the present invention, at least forward nine stages and reverse one stage or more are implemented by a comparatively small number of components and a simple configuration, thereby making it possible to maximize fuel efficiency improvement of the vehicle through driving at an optimal driving point of an engine and improve silence of the vehicle through more silent driving of the engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi stage transmission for a vehicle, comprising:
    an input shaft and an output shaft;
    a first planetary gear device, a second planetary gear device, and a third planetary gear device provided to transfer a torque between the input shaft and the output shaft wherein each of the first, second and third planetary gear devices include first, second, and third rotating elements; and
    at least six shifting elements coupled to the first, second, and third rotating elements of the first to third planetary gear devices,
    wherein the first planetary gear device has:
        the first rotating element of the first planetary gear device which is continuously connected to the input shaft and is selectively connected to the third rotating element of the third planetary gear device;
        the second rotating element of the first planetary gear device which is fixed by one of the at least six shifting elements and selectively connected to the third rotating element of the third planetary gear device; and
        the third rotating element of the first planetary gear device which is selectively connected to the first rotating element of the second planetary gear device and continuously connected to the first rotating element of the third planetary gear device, and wherein the second planetary gear device has:
the first rotating element of the second planetary gear which is fixed by another one of the at least six shifting elements and selectively connected to the first rotating element of the third planetary gear device;
the second rotating element of the second planetary gear which is continuously connected to the output shaft and selectively connected to the first rotating element of the third planetary gear device; and
a third rotating element of the second planetary gear which is continuously connected to the second rotating element of the third planetary gear device.

2. The multi stage transmission for the vehicle of claim 1, wherein the first planetary gear device, the second planetary gear device, and the third planetary gear device are sequentially disposed along a rotating shaft direction of the input shaft and the output shaft.

3. The multi stage transmission for the vehicle of claim 1, wherein the first planetary gear device and the second planetary gear device are configured as a single pinion simple planetary gear device and the third planetary gear device is configured as a double pinion simple planetary gear device.

4. The multi stage transmission for the vehicle of claim 1,
wherein the one of the at least six shifting elements includes a first brake which selectively fixes the second rotating element of the first planetary gear device to a transmission case,
wherein the another one of the at least six shifting elements includes a second brake which selectively fixes the first rotating element of the second planetary gear device to the transmission case, and
wherein the rest of the at least six shifting elements are configured to form variable connection structures between the first, second, and third rotating elements of the first to third planetary gear devices.

5. The multi stage transmission for the vehicle of claim 4, wherein a first clutch among the at least six shifting elements selectively connects between the first rotating element of the first planetary gear device and the third rotating element of the third planetary gear device,
a third clutch among the at least six shifting elements selectively connects between the second rotating element of the first planetary gear device and the third rotating element of the third planetary gear device,
a fourth clutch among the at least six shifting elements selectively connects between the first rotating element of the second planetary gear device and the first rotating element of the third planetary gear device, and
a second clutch among the at least six shifting elements selectively connects between the second rotating element of the second planetary gear device and the first rotating element of the third planetary gear device.

6. A multi stage transmission for a vehicle, comprising:
a first planetary gear device, a second planetary gear device, and a third planetary gear device each having first, second, and third rotating elements;
six shifting elements configured to variably provide a frictional force; and
eight rotating shafts connected to the first, second, and third rotating elements of the planetary gear devices,
wherein a first rotating shaft is an input shaft directly connected to the first rotating element of the first planetary gear device,
a second rotating shaft is directly connected to the second rotating element of the first planetary gear device,
a third rotating shaft is directly connected to the third rotating element of the first planetary gear device and the first rotating element of the third planetary gear device;
a fourth rotating shaft is directly connected to the third rotating element of the third planetary gear device,
a fifth rotating shaft is directly connected to the first rotating element of the second planetary gear device,
a sixth rotating shaft is directly connected to the third rotating element of the second planetary gear device and the second rotating element of the third planetary gear device,
a seventh rotating shaft is an output shaft directly connected to the second rotating element of the second planetary gear device, and
a first clutch among the six shifting elements is installed between the first rotating shaft and the fourth rotating shaft, a second clutch among the six shifting elements is installed between the third rotating shaft and the seventh rotating shaft, a third clutch among the six shifting elements is installed between the second rotating shaft and the fourth rotating shaft, a fourth clutch among the six shifting elements is installed between the third rotating shaft and the fifth rotating shaft, a first brake among the six shifting elements is installed between the second rotating shaft and a transmission case, and a second brake among the six shifting elements is installed between the fifth rotating shaft and the transmission case.

7. The multi stage transmission for the vehicle of claim 6, wherein the first planetary gear device, the second planetary gear device, and the third planetary gear device are sequentially disposed along a rotating shaft direction of the input shaft and the output shaft.

8. The multi stage transmission for the vehicle of claim 6, wherein the first planetary gear device and the second planetary gear device are configured as a single pinion simple planetary gear device and the third planetary gear device is configured as a double pinion simple planetary gear device.

9. The multi stage transmission for the vehicle of claim 6, wherein the first clutch is installed to variably connect between the first rotating element of the first planetary gear device and the third rotating element of the third planetary gear device,
the second clutch is installed to variably connect between the second rotating element of the second planetary gear device and the first rotating element of the third planetary gear device,
the third clutch is installed to variably connect between the second rotating element of the first planetary gear device and the third rotating element of the third planetary gear device, and
the fourth clutch is installed to variably connect between the first rotating element of the second planetary gear device and the first rotating element of the third planetary gear device.

* * * * *

UNITED STATES PATENT AND TRADEMARK OFFICE
CERTIFICATE OF CORRECTION

| | | |
|---|---|---|
| PATENT NO. | : 9,726,258 B2 | Page 1 of 1 |
| APPLICATION NO. | : 14/938677 | |
| DATED | : August 8, 2017 | |
| INVENTOR(S) | : Seong Wook Ji et al. | |

It is certified that error appears in the above-identified patent and that said Letters Patent is hereby corrected as shown below:

On the Title Page

Please insert the following missing foreign priority information:
-- (30) Foreign Application Priority Data:
Sep. 14, 2015 (KR) ................. 10-2015-0129687 --.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*